(12) United States Patent
Hung et al.

(10) Patent No.: US 8,009,528 B2
(45) Date of Patent: Aug. 30, 2011

(54) METHOD FOR RECOVERING MANAGEMENT INFORMATION OF A RECORDING MEDIUM AND APPARATUS THEREFOR

(75) Inventors: Shih-Ta Hung, Taoyuan County (TW); Shih-Hsin Chen, Hsinchu County (TW); Ping-Sheng Chen, Chiayi County (TW)

(73) Assignee: Mediatek Inc., Hsin-Chi (TW)

( * ) Notice: Subject to any disclaimer, the term of this patent is extended or adjusted under 35 U.S.C. 154(b) by 1063 days.

(21) Appl. No.: 11/762,815

(22) Filed: Jun. 14, 2007

(65) Prior Publication Data
US 2008/0310291 A1    Dec. 18, 2008

(51) Int. Cl.
*G11B 5/09* (2006.01)
(52) U.S. Cl. .................. 369/47.14; 369/53.17
(58) Field of Classification Search ............... 369/47.14, 369/53.15, 53.17, 53.18, 275.3, 275.2; 711/111, 711/112, 4; 714/710, 711
See application file for complete search history.

(56) References Cited

U.S. PATENT DOCUMENTS

| | | | |
|---|---|---|---|
| 7,397,744 B2 | 7/2008 | Terada et al. | |
| 2005/0047294 A1* | 3/2005 | Park | 369/47.14 |
| 2005/0270946 A1* | 12/2005 | Kim | 369/47.14 |
| 2006/0087943 A1* | 4/2006 | Kuraoka et al. | 369/47.14 |
| 2007/0189135 A1* | 8/2007 | Tazawa et al. | 369/47.14 |

* cited by examiner

*Primary Examiner* — Tan X Dinh
(74) *Attorney, Agent, or Firm* — Thomas|Kayden

(57) ABSTRACT

A method for recovering disc management information of a recording medium. (a) When the recording medium is not closed, a readable TDMS which is included in an in-use TDMA of TDMAs of the recording medium and is readable is searched for. (b) It is determined whether a piece of information associated with an inconsistency flag of the readable TDMS is reliable. (c) If the associated piece of information is unreliable, at least a detection condition is determined according to the information included in the readable TDMS and the in-use TDMA. (d) A detection procedure, constrained by the at least the detection condition, is performed on the recording medium for determining an update on the piece of information associated with the inconsistency flag. (e) An update TDMS is generated according to the readable TDMS and the update on the piece of information associated with the inconsistency flag.

28 Claims, 5 Drawing Sheets

| Byte | Bit | b7 | b6 | b5 | b4 | b3 | b2 | b1 | b0 |
|---|---|---|---|---|---|---|---|---|---|
| 1026 | | reserved | | | | | LRA | SRRI | TDFL |
| 1027 | | reserved | | | | | | SBM1 | SBM0 |

METHOD FOR RECOVERING MANAGEMENT INFORMATION OF A RECORDING MEDIUM AND APPARATUS THEREFOR

BACKGROUND OF THE INVENTION

1. Field of the Invention

The invention relates in general to an apparatus for accessing a recording medium and a method for recovering medium management information, and more particularly to a write-once optical disc drive and a method for recovering disc management information.

2. Description of the Related Art

Recording media of high-density data storage, such as optical discs, are developing for storing much more data in order to meet the needs of storing large amount of multimedia data with smaller number of recording media. The optical discs, such as blu-ray discs, provide capacity of up to tens of GBs. With such large capacity for data storage, disc management indicating the status of the optical disc ensures error free storage space and enables different recording modes. A recording medium generally provides areas for storing information for disc management and reading or writing user data on the recording medium requires accessing the latest disc management information. Once the disc management information becomes unreliable, such as being damaged, lost, or out-of-dated, the user data being read from or written into the recording medium would be unreliable. In such case, the disc management information must be recovered before further accessing of the recording medium.

As an example, before a recordable blu-ray disc (BD-R) is closed or finalized, a data structure called temporary disc management structure (TDMS) is employed for disc management. The BD-R supports two recording modes, sequential recording mode (SRM) and random recording mode (RRM), and recording data on a BD-R can only be performed under a selected one of the two recording modes. The TDMS for a BD-R includes disc management information, depending on the recording mode selected for the BD-R. For SRM, the TDMS includes a temporary disc definition structure (TDDS), a temporary defect list (TDFL), and sequential recording range information (SRRI). For RRM, the TDMS includes a TDDS, a TDFL, and a space bit map (SBM). In order to indicate whether the information contained in the TDDS is reliable, a number of specific fields, called inconsistency flags in BD-R specifications, as in FIG. 2, are defined in the TDDS for either SRM or RRM. When one of the inconsistency flags is set to a value, such as 1, indicating that a disc is in the drive for accessing the disc and the information associated with this flag in the TDMS may not be reflecting the actual status of the disc, the information associated with this flag is unreliable and must be recovered.

However, the conventional approaches to recovery of information associated with an inconsistency flag are inefficient. According to the BD-R specifications section 6.7.6.4, a method for rebuilding the TDFL has been described involving reading all the replacement clusters when the TDFL is damaged or invalid due to e.g. power failure. Regarding SBM or LRA, rebuilding requires reading all clusters of the disc conventionally. All these methods are time-consuming and thus inefficient.

Therefore, it is desirable to recover the information of the TDMS efficiently in a case that the information for disc management is unreliable.

SUMMARY OF THE INVENTION

It is therefore an object of the invention to provide a method for recovering management information of a recording medium and an apparatus therefor. According to the invention, the management information of the TDMS can be recovered efficiently in case that a piece of information for disc management is unreliable. With the recovered TDMS, user data on the recording medium can be read correctly and data to be written will not overwrite the user data recorded on the recording medium.

According to an embodiment of the invention, a method of recovering disc management information of a recording medium is provided. The recording medium includes a user data area and a plurality of temporary disc management areas (TDMAs) on at least one recording layer, wherein each TDMA is for storing disc management information including a plurality of temporary disc management structures (TDMSs), each TDMS includes a temporary disc definition structure (TDDS), defect management information, and recording management information for enabling and controlling a recording mode on the recording medium. The method includes the following steps. (a) When the recording medium is not closed, a readable TDMS which is a TDMS included in an in-use TDMA of the TDMAs and is readable is searched for. (b) It is determined whether a piece of information associated with an inconsistency flag of the readable TDMS is reliable or not. (c) If the piece of information associated with the inconsistency flag is unreliable, at least a detection condition is determined according to the information which is included in the readable TDMS and the in-use TDMA. (d) A detection procedure, constrained by the at least the detection condition, is performed on the recording medium for determining an update on the piece of information associated with the inconsistency flag. (e) An update TDMS is generated according to the readable TDMS and the update on the piece of information associated with the inconsistency flag.

According to another embodiment of the invention, an apparatus for recovering management information of a recording medium is provided. The recording medium includes a user data area and a plurality of temporary disc management areas (TDMAs) on at least one recording layer, wherein each TDMA is for storing disc management information including a plurality of temporary disc management structures (TDMSs), each TDMS includes a temporary disc definition structure (TDDS), defect management information, and recording management information for enabling and controlling a recording mode on the recording medium. The apparatus includes a pickup head unit and a controller for controlling the pickup head unit to detect whether to recover disc management information if the recording medium is not closed. The controller controls the pickup head unit to search the TDMAs for a readable TDMS which is a TDMS included in an in-use TDMA of the TDMAs and is readable, and determine whether a piece of information associated with an inconsistency flag of the readable TDMS is reliable or not. When the controller detects that the piece of information associated with the inconsistency flag is unreliable, the controller determines at least a detection condition according to the information which is included in the readable TDMS and the in-use TDMA, and controls the pickup head unit to detect the recording medium to determine an update on the piece of information associated with the inconsistency flag, under at least a detection condition. The controller generates an update TDMS according to the readable TDMS and the update on the piece of information associated with the inconsistency flag.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
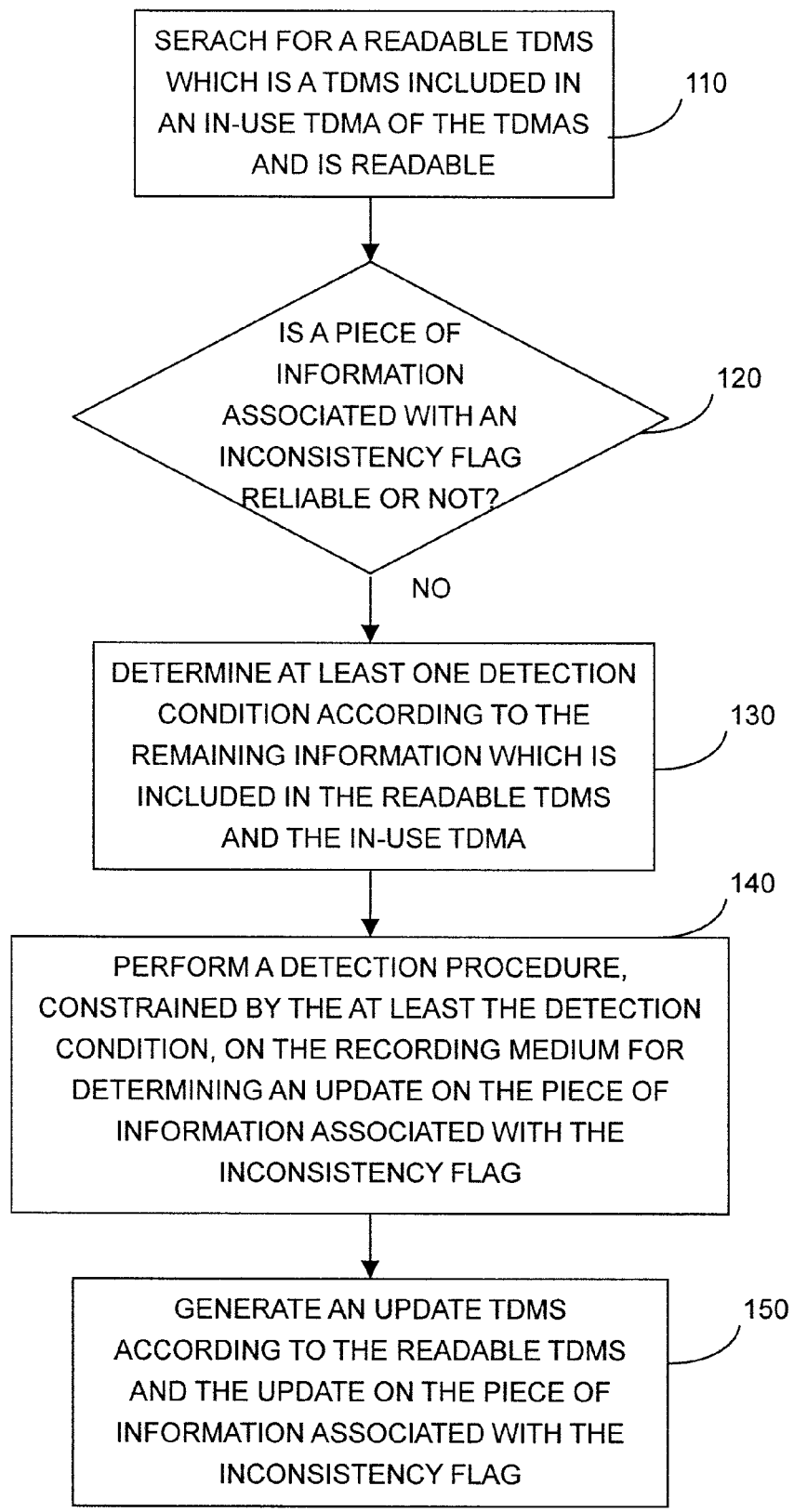
FIG. 1 illustrates a method for recovering management information of a recording medium according an embodiment of the invention.

Referring to FIG. 1, a method of recovering disc management information of a recording medium is illustrated according to an embodiment of the invention to indicate status of the recording medium. According to the embodiment, when it is detected that a piece of management information of the recording medium is unreliable, at least one detection condition is determined according to the remaining management information which is still readable on the recording medium. A detection procedure, constrained by at least the determined detection condition, is performed on the recording medium in order to determine an update on the detected piece of unreliable management information. In this way, the management information can be recovered efficiently according to the update and the remaining management information. In addition, for a specific piece of management information of a recording medium, such as temporary defect list for a BD-R, embodiments are provided to make use of still readable management information on the recording medium to enhance the efficiency of recovery.

As an example, the recording medium, such as a recordable optical disc, includes a user data area and a plurality of temporary disc management areas (TDMAs) on at least one recording layer of the recording medium. Each TDMA is for storing disc management information including a plurality of temporary disc management structures (TDMSs), and each TDMS includes a temporary disc definition structure (TDDS), defect management information, e.g. a temporary defect list (TDFL), and recording management information, such as sequential recording range information (SRRI) or space bit map (SBM) for enabling and controlling a recording mode on the recording medium. The TDDS includes at least an inconsistency flag indicating whether an associated piece of information included in the TDMS is reliable.

Figures 2, 3:
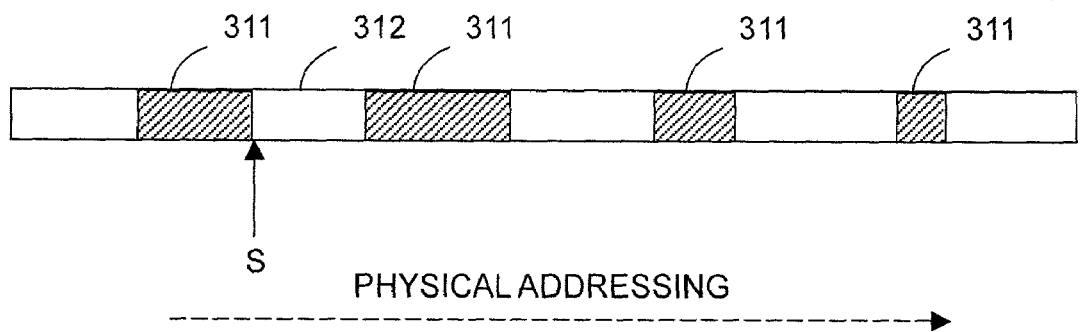
FIG. 2 (Prior Art) shows inconsistency flags for a recordable blu-ray disc (BD-R).
FIG. 3 illustrates a user data area with recorded areas and unrecorded areas which being detecting for recovering an SBM in an embodiment of the invention.

One of the examples of the recording medium is a recordable blu-ray disc (BD-R). As illustrated in FIG. 2, a TDDS recorded on a BD-R includes bits 0 to 2 of the $1026^{th}$ byte and bits 0 and 1 of the $1027^{th}$ byte as inconsistency flags indicating whether a number of associated pieces of management information, such as TDFL, SRRI, LRA, SBM0 (for layer 0) or SBM1 (for layer1) included in the TDMS, are reliable. When one of the inconsistency flags is equal to a value, such as 1, indicating that a disc is in the drive for accessing the disc and the associated piece of information in the TDMS may not be reflecting the actual status of the disc, the information associated with this flag is unreliable and must be recovered.

Referring back to FIG. 1, a method of recovering disc management information of a recording medium is illustrated according to an embodiment of the invention. In step 110, when the recording medium is not closed, the recording medium is searched for a readable TDMS that is a TDMS included in an in-use TDMA of the TDMAs and is readable. Next, as indicated by step 120, it is detected whether a piece of information associated with an inconsistency flag of the readable TDMS is reliable or not. If it is detected that the piece of information associated with this inconsistency flag of the readable TDMS is unreliable, at least one detection condition is determined according to the remaining information which is included in the readable TDMS, as indicated by step 130. Next, in step 140, a detection procedure, constrained by the at least the detection condition, is performed on the recording medium for determining an update on the detected piece of information associated with the inconsistency flag. After that, an update TDMS according to the readable TDMS and the update on the detected piece of information associated with the inconsistency flag. In this way, the update TDMS is determined efficiently, e.g. avoiding reading the entire user data area.

After recovery of the management information, as indicated in FIG. 1, the update TDMS can be recorded on the recording medium, wherein the inconsistency flag in the update TDMS is set to indicate that the update on the information associated with the inconsistency flag is reliable. In this regard, a recording medium drive where the recording medium is being accessed can decide whether and when to record the update TDMS or management information on the recording medium after recovery. In one embodiment, the recording medium drive records the update TDMS on the recording medium immediately after recovery for reliability of further accessing the recording medium. In another embodiment, rather than recording the update TDMS after the recovery immediately, the drive stores the update TDMS in a memory of the drive and continues to record user data on the recording medium while maintaining the stored TDMS. The maintained TDMS stored in the memory will not be recorded on the recording medium until it is determined to do so, e.g. for a specific of time or when the recording medium is finalized.

The embodiment illustrated in FIG. 1 makes use of the readable TDMS to recover the detected piece of unreliable management information. For example on a BD-R, the latest TDMS is searched for as a readable TDMS since the TDMSs are stored consecutively in the TDMAs. In one embodiment, the recording medium is searched for a readable TDMS by determining whether a latest TDMS included in an in-use TDMA of the TDMAs is readable when the recording medium is not closed. If the latest TDMS is readable, the latest TDMS is regarded as the readable TDMS. If the latest TDMS is not readable, finding a TDMS which is previous to the latest TDMS and is readable is performed. The found TDMS is regarded as the readable TDMS.

Regarding step 120, whether a piece of information associated with an inconsistency flag of the readable TDMS is reliable or not can be determined by checking whether the inconsistency flag indicates unreliability of the associated piece of information. For example on a BD-R, if one of the inconsistency flags, as indicated by FIG. 2, of the latest TDDS of the readable TDMS has a value, e.g. 1, indicates the associated piece of information associated with the flag is unreliable since such information may not be reflecting the actual status of the BD-R. As another example, a piece of information associated with an inconsistency flag in a readable TDMS is unreliable if the piece of information cannot be read correctly, i.e. unreadable, even though the associated inconsistency flag indicates up-to-date, e.g. equal to 0. In an example, there are a number of inconsistency flags associated with different pieces of information included in a TDMS. If it is detected that a piece of information associated with one inconsistency flag is reliable, step 120 may be repeated to detect another piece of information associated with another inconsistency flag.

On a BD-R, for example, there are a number of inconsistency flags associated with different pieces of information included in a TDMS. The following embodiments are provided to recover the associated pieces of information in the TDMS efficiently.

Embodiment About Recovery of SBM

One embodiment of the invention about recovery of SBM can be based on the steps indicated in FIG. 1. In this embodiment, the recording medium, such as a BD-R, is in a random recording mode. A readable TDMS is found by step 110. In step 120 for this embodiment, the inconsistency flag of the readable TDMS is associated with recording management information of the readable TDMS, and the recording management information is a space bit map (SBM).

If the SBM of the readable TDMS is unreliable, as determined by step 120, at least one detection condition can be determined according to the remaining information which is included in the readable TDMS, as indicated by step 130. As one example, a reference SBM which is readable and previous to the unreliable SBM of the readable TDMS within the readable TDMS is taken as a detection condition.

In step 140 for this embodiment, the detection procedure is performed on the recording medium for determining an update on the SBM, and the detection procedure searches only blank areas in the user data area indicated by the reference SBM. Consequently, a reduced time of recovering SBM can be achieved according to the detection procedure, as compared to detecting every cluster of the entire disc conventionally.

An example of the detection procedure in this embodiment is described. For the sake of illustration, a user data memory space on the recording medium is illustrated in FIG. 3 where the blocks 311 filled with sloped lines indicate recorded areas and the blank blocks, such as a block 312, indicate blank areas and the addressing, either logical or physical, is taken from the left side to right side as indicated by the dashed arrow labeled "physical addressing". The detection procedure begins with seeking a beginning of one of the blank areas indicated by the reference SBM on the recording medium. As illustrated in FIG. 3, a blank area 312 has a beginning, pointed at by an arrow labeled "S". Next, sequentially from the beginning of the one of the blank areas indicated by the reference SBM, detection as to whether blanks occur is performed to obtain blank information and the obtained blank information is buffered until the one of the blank areas indicated by the reference SBM ends. In this embodiment, the above steps of the detection procedure are repeated until the detection for blank information are performed on all of the blank areas indicated by the reference SBM. The buffered blank information is converted into a SBM, according to the specification of the recording medium, to represent whether each unit of space, e.g. each cluster, on the recording medium has a free space. An update on the SBM is thus generated. After the detection procedure, in step 150, an update TDMS is generated according to the readable TDMS and the update on the SBM generated by the detection procedure.

In a further example, the detection procedure is performed on the recording medium by controlling a recording head of a disc drive by track-following to read the recording medium for blank detection for efficiency.

Embodiment About Recovery of LRAs

One embodiment of the invention about recovery of last recorded addresses (LRAs) can be based on the steps indicated in FIG. 1. In this embodiment, the recording medium is in a sequential recording mode. A readable TDMS is found by step 110. In step 120 for this embodiment, the inconsistency flag of the readable TDMS is associated with the LRAs indicated in the readable TDMS, and recording management information of the readable TDMS is sequential recording range information (SRRI).

In the sequential recording mode, the BD-R drive makes use of a logical track that is referred to as sequential recording range (SRR) and logical sessions just like other sequential recording media, while still providing the flexibility of allowing simultaneous recording with up to sixteen open SRRs, for example. This scheme is controlled with SRRI, wherein the SRRI includes a start address and a last recorded address (LRA) of each logical track, i.e. each open SRR. In addition, the latest TDDS includes a field for indicating the last recorded address of a user data area, i.e. the LRA of the whole recording medium.

In step 120, if it is determined that the inconsistency flag associated with LRAs, e.g. equal to 1, indicates that the LRAs on the recording medium are unreliable, at least one detection condition can be determined according to the remaining information which is included in the readable TDMS, as indicated by step 130. In one example, if, among other inconsistency flags, only the inconsistency flag associated with LRAs indicates unreliability of the associated pieces of information, the SRRI of the readable TDMS including a start address and a corresponding last recorded address of each open SRR is taken as a detection condition.

In step 140 for this embodiment, the detection procedure, constrained by the detection condition, is performed on the recording medium for determining an update on the LRAs, including the actual LRA of the whole recording medium and actual LRA of each SRR. The detection procedure searches each open SRR, i.e. each logical track, indicated in the SRRI to determine actual LRA of each SRR. The start address and LRA indicated in the SRRI can be used as boundary conditions for the search. Since the LRA in the TDDS is the maximum value of the user data area, the update LRA in the TDDS can be determined using the actual LRAs of all SRR found. In step 150, the update TDMS can be generated according to all the actual LRAs found above. Consequently, a reduced time of recovering LRAs can be achieved according to the detection procedure, as compared to detecting every cluster of the entire disc conventionally.

Figure 4:
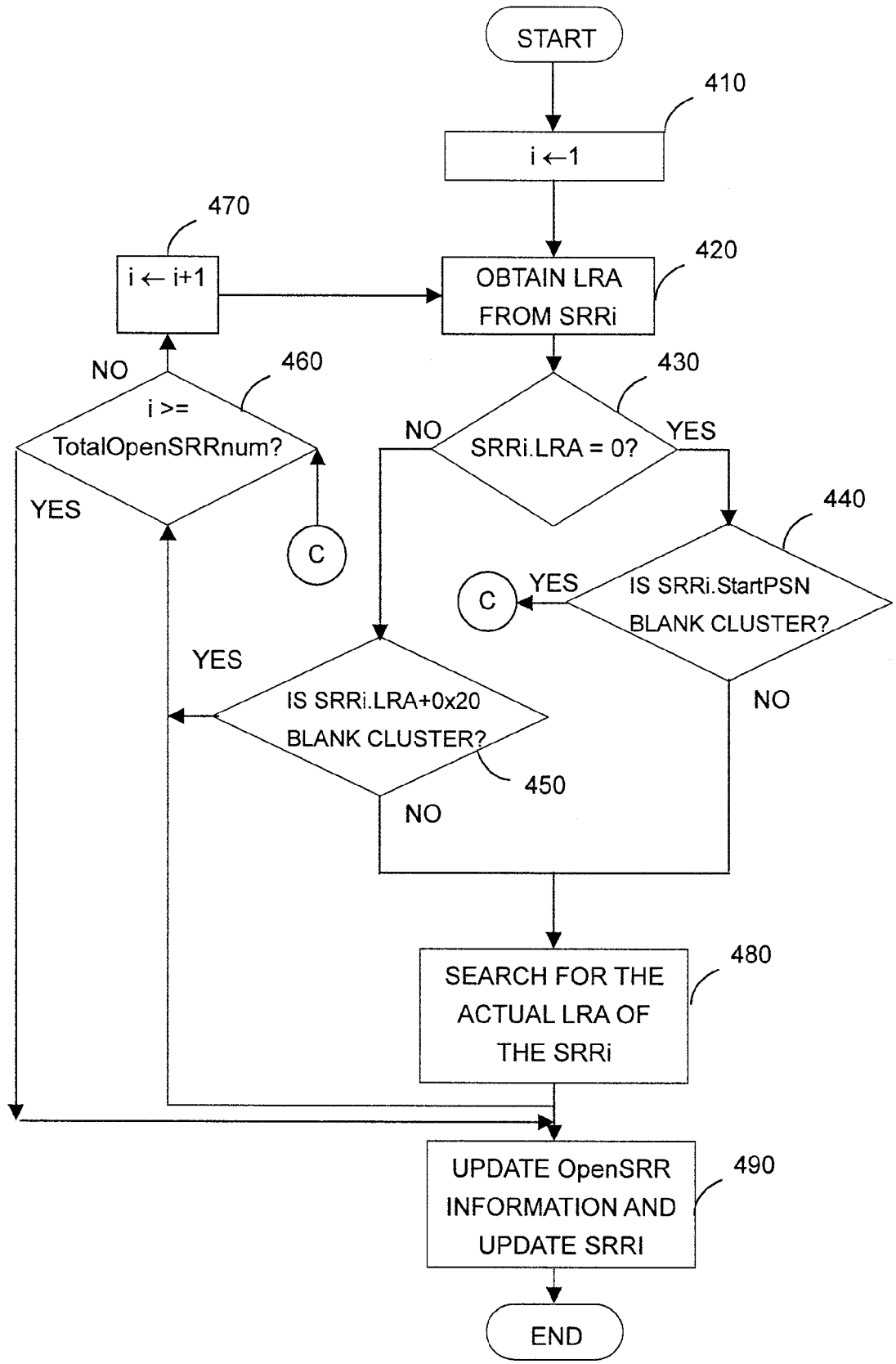
FIG. 4 illustrates recovering LRAs according to an embodiment of the invention.

An example of the detection procedure in this embodiment is described. FIG. 4 illustrates a flowchart of the example of the detection procedure for recovery the LRAs. Since only the inconsistency flag associated with LRAs indicates unreliability of the associated pieces of information, the SRRI from the readable TDMS is taken as a detection condition, as above mentioned. First, for each SRR indicated in the SRRI of the readable TDMS, it is determined whether the SRR indicates a blank area, as indicated by steps 420 to 450. If so, another SRR indicated in the SRRI of the readable TDMS is detected, as indicated by steps 460, 470, and 420. If the SRR does not indicate a blank area, the SRR is searched for its LRA by a search method, e.g. binary search, as indicated by step 480. After the LRA of the SRR is determined, the procedure proceeds to step 460 to detect another SRR indicated in the SRRI of the readable TDMS until each open SRR indicated in the SRRI of the readable TDMS is checked. The detection procedure generates an update on each open SRR information and SRRI, as indicated by step 490.

Specifically, the example of the detection procedure for recovery LRAs employs the start address and LRA indicated in the SRRI of the readable TDMS as boundary conditions for the search. It is supposed that there is a number of open SRRs, denoted by TotalOpenSRRnum (e.g. at least one), and a start physical section number (PSN) and LRA of each open SRR are included in the SRRI of the readable TDMS on the recording medium. The detection procedure sequentially employs the start PSN and LRA of each open SRR. Initially, in step 410, an index i is assigned to one. An LRA of a first SRR (ith SRR), denoted by SRRi.LRA, is then obtained from the SRRI of the readable TDMS, as indicated by step 420, but may not reflect the actual status of the recording medium since the associated inconsistency flag indicates unreliability of the LRAs. A determination as to whether the LRA of the first SRR (ith SRR) indicates a logical block address of zero, as indicated by step 430. If so, it is checked whether the start physical sector number (PSN) of the ith SRR, denoted by SRRi.StartPSN, indicates blank cluster. If it is determined that the SRRi.StartPSN indicates a blank cluster, the detection proceeds to step 460 to repeat the detection of blank cluster with another open SRR. If the SRRi.StartPSN does not indicate a blank cluster, step 480 is performed. In addition, if it is determined in step 430 that the SRRi.LRA does not indicate a logical block address of zero, step 450 is performed to check whether the logical block address of the SRRi.LRA plus 0x20, i.e. one cluster after the SRRi.LRA, indicates a blank cluster. If so, the detection procedure proceeds to step 460 to repeat the detection of blank cluster with another open SRR. If not indicating a blank cluster, step 480 is performed. In step 480, the actual LRA of the ith open SSR is searched for by using a search method with the start PSN and LRA of the ith open SSR as boundary conditions. The search method may be a binary search or other search method that can find the actual LRA. In addition, blank detection can also be used in step 480.

Embodiment About Recovery of TDFL

The temporary defect list (TDFL) lists any defect locations and their corresponding replacement locations allocated by the defect management system of the recording medium. The recording medium, such as BD-R, supports logical overwriting of already written user data, thus effectively mimicking a rewritable medium. Such logical overwriting (LOW), i.e. writing to the same LSN, but actually recording at a reassigned PSN by linear replacement, is treated in the same way as defect management. That is, the information on the replacement is stored in the same defect list.

For LOW or Defect management, after performing the replacement of the data, location information of a data area where data was to be written and a replacement data area is recorded in the TDFL as a Defect List Entry (DFL Entry). The DFL entry is categorized into a re-allocated defect (RAD) type and a continuous re-allocated defect (CRD) type. The DFL entry of the RAD type includes information on a defect handling or LOW performed in a single cluster. Each entry includes a first PSN of a first cluster of the area where defect handling or LOW is performed, and a first PSN of a first cluster of the area where replacement recording of the defect handling or LOW is performed. On the other hand, the DFL entry of the CRD type uses two entries to indicate location information on defect handling or LOW performed in a plurality of consecutive clusters. Specifically, one of the two entries includes a first PSN of a first cluster where defect handling or LOW is performed and a first PSN of a first cluster where replacement recording of the defect handling or LOW is performed. The other entry includes a first PSN of a last cluster where defect handling or LOW is performed, and a first PSN of a last cluster where replacement recording of the defect or LOW is performed.

One embodiment of the invention about recovery of temporary defect list (TDFL) can be based on the steps indicated in FIG. 1. A readable TDMS is found by step 110. In step 120 for this embodiment, the inconsistency flag of the readable TDMS is associated with defect management information of the readable TDMS, the defect management information of the readable TDMS is a temporary defect list (TDFL).

In step 120, if it is determined that the inconsistency flag associated with the TDFL, e.g. equal to 1, indicates that the TDFL on the recording medium is unreliable, at least one detection condition can be determined according to the remaining information which is included in the readable TDMS, as indicated by step 130. In an example of determination of the detection condition, if the recording medium is in a sequential recording mode and recording management information of the readable TDMS is sequential recording range information (SRRI), at least a detection condition can be determined according to information of sequential recording ranges (SRRs) included in the SRRI of the readable TDMS. In one example, if, among other inconsistency flags, only the inconsistency flag associated with the TDFL indicates unreliability of the associated piece of information, the LRA in the TDDS and the SRRI of the readable TDMS are taken as a detection condition. In another example, if the recording medium is in a random recording mode and the recording management information of the readable TDMS is a space bit map (SBM), at the least a detection condition can be determined according to information of the space bit map (SBM).

In step 140 for this embodiment, the detection procedure, constrained by the detection condition, is performed on the recording medium for determining an update on the TDFL. In one example where the recording medium is in the sequential recording mode, the detection procedure detects each open SRR, i.e. each track, indicated in the SRRI of the readable TDMS for determining an update on the TDFL. For example, the detection procedure detects each open SRR indicated in the SRRI from the start PSN of the open SRR to the LRA of the open SRR and the detection procedure further detects the user data area up to the LRA indicated in the TDDS. Consequently, a reduced time of recovering the TDFL can be achieved according to the detection procedure, as compared to detecting every cluster of the entire disc conventionally. In another example where the recording medium is in the random recording mode, the detection procedure detects the SBM of the readable TDMS for determining an update on the TDFL.

In a first example of the detection procedure constrained by the detection condition, an optical head is controlled by an optical disc drive to read address unit (AU) information from an optical disc during track-following and buffer the AU information in a memory of the optical disc drive so as to generate an update on the TDFL. During the detection procedure, the optical head can be controlled to read AU information during track-following, without the needs of seeking every cluster again.

Further, it is sufficient to decode AF flag bits for the generation of TDFL during the detection procedure. According to definition of address unit (AU) for recording user data in a cluster on a recording medium, such as BD-R, the AU includes 16 address unit numbers (AUNs) corresponding to 32 logical blocks of the cluster, and control information of the cluster. For example in a BD-R, the information contained in the AU can be represented in terms of address field (AF)

notation $AF_{x,y}$, where $0 \leq x \leq 8$ and $0 \leq y \leq 15$. Among the others, $AF_{4,0}$ to $AF_{4,15}$ are referred to as flag bits or AF flag bits, indicating control information including the location information of an original cluster prior to replacement, i.e. previous location address (PLA), if a corresponding cluster of the AF flag bits is a replacement cluster. Therefore, an update on TDFL can be generated by converting the AU information, at least the decoded AF flag bits, buffered in the memory of the disc drive into a TDFL according to the format of a TDFL, as described above for BD-R specifications, for example.

Figure 5:
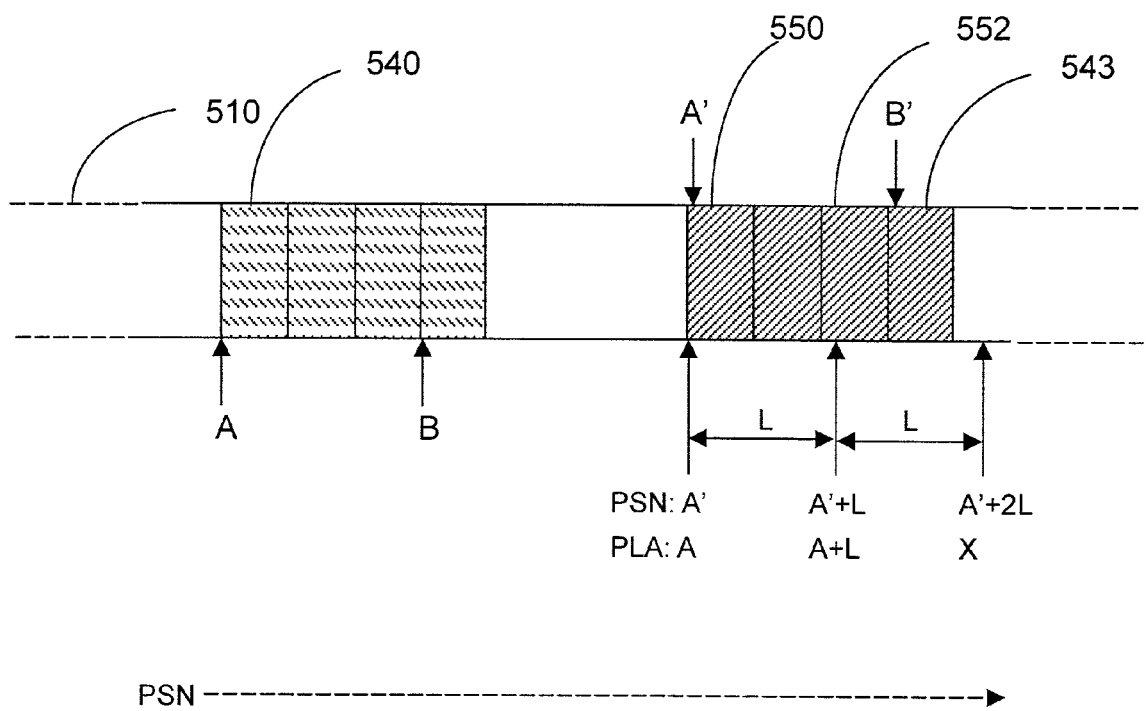
FIG. 5 illustrates recovering TDFL according to an embodiment of the invention.

A second example of the detection procedure based on the first one is provided to search for first and last replacement clusters to recover a DFL entry of CRD type efficiently. For the sake of illustration, it is supposed that a defect handling or LOW operation has been performed on a plurality of clusters in a physical logical memory space 510 of a recording medium, and the corresponding replacement clusters are clusters 550 to 543, as shown in FIG. 5. In FIG. 5, the first and last ones of the replaced clusters are indicated by upward arrows followed by characters A and B, where A represents the first PSN of the first one of the replaced clusters and B represents the first PSN of the last one of the replaced clusters. In FIG. 5, the first and last ones of the replacement clusters are indicated by downward arrows followed by characters A' and B', where A' represents the first PSN of the first one of the replacement clusters and B' represents the first PSN of the last one of the replacement clusters.

In this example of the detection procedure, when it is detected that a data unit, such as a cluster 550 in FIG. 5, firstly includes a previous location address (PLA), say a PSN of A, in its AU (e.g. this occurs as the PLA bits not all equal to zero), it indicates that a defect handling or LOW operation has been performed, wherein the detected cluster is a replacement cluster and a cluster with a first PSN of A, as indicated by block 540, is the original cluster to be rewritten logically.

A location of a first PSN, say A, of the detected cluster 550 plus a number of L (e.g. 70) is then sought so as to detect a PLA for the location of A'+L, wherein the location of the first PSN of the detected cluster 550 is derived from the corresponding AU. If it is detected that the location of A'+L has a corresponding PLA of A+L, as illustrated in FIG. 5, the difference between the detected location and its corresponding PLA in the above two detection operations at PSN A' and PSN A'+L is of the same, i.e. A'−A. This is, a defect handling or LOW operation of CRD type has been performed, beginning at a cluster having a first PSN of A, as illustrated by cluster 540, with a first replacement cluster 550. The first PLA-detected cluster 550 to the cluster 552 corresponding to the location A'+L are replacement clusters. Hence, the two DFL entries can be recovered in an update on TDFL when a last replacement cluster for this CRD-type can be found.

Accordingly, seeking at a following location of A'+L plus a number, such as L (e.g. 70) or other number (e.g. 100), is then performed so as to detect a PLA for the location of A'+2L. The above detection operations are repeated until it is detected that the difference between a newly detected location and its corresponding PLA is different from the previous difference A'−A. For illustration, in FIG. 5, the PLA for the location of A'+2L is X and the difference between A'+2L and X is not equal to A'−A. This indicates that the seeking at the current location A'+2L has been out of a last replacement cluster (e.g. cluster 543) of this CRD-type. Thus, a backward search is needed to determine the last replacement cluster within the locations between A'+L and A'+2L. The backward searching for the last replacement cluster can be implemented with different approaches, such as binary search. Finally, the last replacement cluster 543 is found with its first PSN B' and PLA B, where B' and B can be derived from the AU of the cluster 543. Therefore, the second example of the detection procedure can efficiently recover DFL entries of CRD type, avoiding inefficient one-after-one searching for clusters.

In the first and second examples of the detection procedures above, it is supposed that if, among other inconsistency flags, only the inconsistency flag associated with the TDFL indicates unreliability of the associated piece of information, the LRA in the TDDS and the SRRI of the readable TDMS are taken as a detection condition for recovering TDFL. In other cases, if not only the inconsistency flag associated with the TDFL indicates unreliability of the associated piece of information, the LRA in the TDDS and the SRRI or the SBM of the readable TDMS may be unreliable. In further examples, by further checking the consistency flags for information in TDMS such as LRA and SRRI or the SBM, one or more detection conditions may be determined for use in the detection procedure performed in step 140; for instant, the start PSN of each SRR in the SRRI may be useful as a boundary condition for recovery of DFL entry if the inconsistency flag for LRA also indicates unreliability.

In this worst case, if the consistency flags for information in the TDMS such as SRRI or SBM, LRA, TDFL indicate unreliability of their associated information, the detection procedure can also take the basic information of the readable TDMS, such as "first PSN of drive area" or "last LSN of user data area", as the detection condition for use in step 140.

Figure 6:
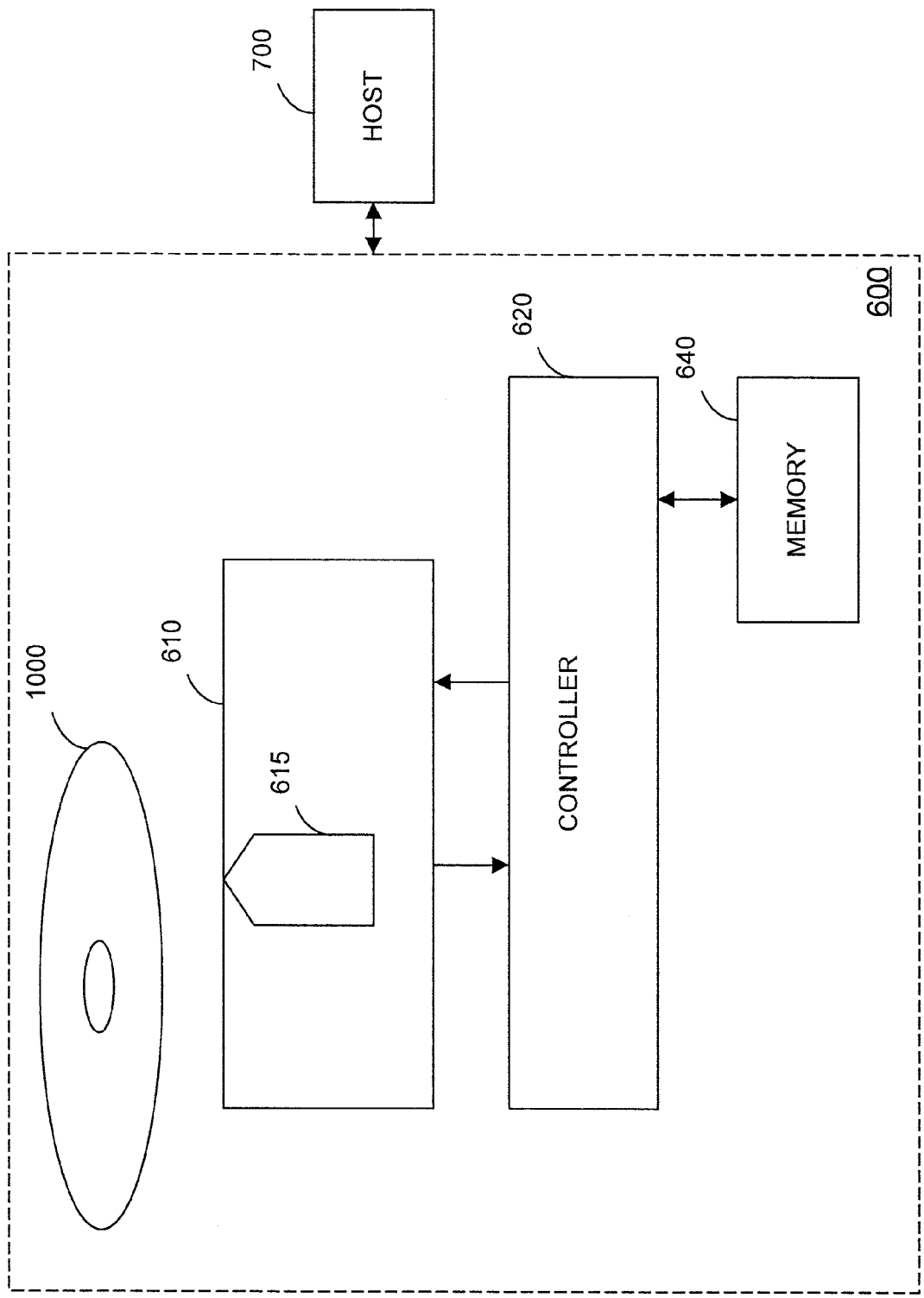
FIG. 6 illustrates a recording/reproducing system according to an embodiment of the invention.

FIG. 6 illustrates a recording/reproducing system according to an embodiment of the invention. The method according to the invention, such as one or any combination of those embodiments, as well as examples, described above, can be implemented by the system of FIG. 6 or other suitable device/system. The recording/reproducing system includes a recording/reproducing apparatus 600 for performing reproduction and/or recording from/on a recording medium, such as an optical disc 1000, and a host 700 for controlling the recording/reproducing unit 600. The host 700 sends a record command or a reproduce command for a specific area on the disc to the recording/reproducing unit 600. The recording/reproducing unit 600 performs the recording/reproduction in the specific area according to the command of the host 700.

The recording/reproducing unit 600 can include a data access unit 610, a controller 620, and a memory 640. The data access unit 610 includes a pickup head unit 615 for directly recording or reproducing data to/from the optical disc 1000. The controller 620, for example, is programmed to perform a method of recovering management information according to the invention, such as one or any combination of those embodiments, as well as examples, described above. During the performing of the method, the pickup head unit 615 is controlled by the controller 620. In addition, the memory 640 is for temporarily storing a variety of information including the management information and data.

In one embodiment, the recording/reproducing system including the recording/reproducing unit 600 and the host 700 is implemented as an audio/video recording/reproducing device, which can access an optical disc 1000. In another embodiment, the recording/reproducing unit 600 can be implemented as an optical drive, externally or internally linked to a data processing apparatus, such as a computer, operable as the host 700. As an example, when the optical disc 1000, such as a BD-R, is placed in the recording/reproducing unit 600, the controller 620 detects the optical disc 1000 and determines whether the disc management information recorded on the optical disc 1000 is reliable so as to perform a recovery method according to the invention is needed to perform. The recovery method may be performed when the recording/reproducing unit 600 is idle, e.g. no read or write command is sent from the host 700. In other example, the recording/reproducing unit 600 in response to a command, such as a write command, checks whether an update on information included in the disc management information. If so, the records the update on the recording medium. Once the disc management information is recovered, the optical disc 1000 is ready to be written or read. When the optical disc 1000 is closed or finalized, the recovered disc management information is written into the optical disc 1000 where the inconsistency flag is set to indicate that the update on the associated piece of information is reliable.

As disclosed in the above embodiments, a method for recovering management information of a recording medium and an apparatus therefor are provided. According to the invention, the management information of the TDMS can be recovered efficiently in case that a piece of information for disc management is unreliable. With the recovered TDMS, user data on the recording medium can be read correctly and data to be written will not overwrite the user data recorded on the recording medium.

While the invention has been described by way of examples and in terms of embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for recovering disc management information of a recording medium, the recording medium including a user data area and a plurality of temporary disc management areas (TDMAs) on at least one recording layer, wherein each TDMA is for storing disc management information including a plurality of temporary disc management structures (TDMSs), each TDMS includes a temporary disc definition structure (TDDS), defect management information, and recording management information for enabling and controlling a recording mode on the recording medium, the method comprising:
    (a) when the recording medium is not closed, searching for a readable TDMS which is a TDMS included in an in-use TDMA of the TDMAs and is readable;
    (b) determining whether a piece of information associated with an inconsistency flag of the readable TDMS is reliable or not;
    (c) if the piece of information associated with the inconsistency flag is unreliable, determining at least a detection condition according to the information which is included in the readable TDMS and the in-use TDMA;
    (d) performing a detection procedure, constrained by the at least the detection condition, on the recording medium for determining an update on the piece of information associated with the inconsistency flag;
    (e) generating an update TDMS according to the readable TDMS and the update on the piece of information associated with the inconsistency flag.

2. The method according to claim 1, further comprising:
    (f) recording the update TDMS on the recording medium, wherein the inconsistency flag in the update TDMS is set to indicate that the update on the piece of information associated with the inconsistency flag is reliable.

3. The method according to claim 1, wherein step (a) comprises:
    (a1) when the recording medium is not closed, determining whether a latest temporary disc management structure (TDMS) included in an in-use TDMA of the TDMAs is readable;
    (b1) if the latest TDMS is readable, proceeding to step (b), wherein the latest TDMS is regarded as the readable TDMS; and
    (c1) if the latest TDMS is not readable, finding a TDMS which is previous to the latest TDMS and is readable, and proceeding to step (b) if the TDMS which is previous to the latest TDMS and is readable is found, wherein the found TDMS is regarded as the readable TDMS.

4. The method according to claim 1, wherein the recording medium is in a random recording mode, and the inconsistency flag of the readable TDMS is associated with recording management information of the readable TDMS, and the recording management information is a space bit map (SBM).

5. The method according to claim 4, wherein step (c) comprises:
    finding a reference SBM which is readable and previous to the SBM of the readable TDMS within the readable TDMS and the in-use TDMA; and
    determining the reference SBM as a detection condition.

6. The method according to claim 5, wherein in step (d), the detection procedure is performed on the recording medium for determining an update on the SBM, and the detection procedure searches only blank areas in the user data area indicated by the reference SBM in step (c).

7. The method according to claim 6, wherein the detection procedure in step (d) comprises:
    (d1) seeking a beginning of one of the blank areas indicated by the reference SBM in step (c) on the recording medium;
    (d2) sequentially from the beginning of the one of the blank areas indicated by the reference SBM, detecting whether blanks occur so as to obtain blank information and buffering the obtained blank information, until the one of the blank areas indicated by the reference SBM ends.

8. The method according to claim 7, wherein in step (d2), the detection is performed on the recording medium by track-following and blank detection.

9. The method according to claim 1, wherein the recording medium is in a sequential recording mode, the inconsistency flag of the readable TDMS is associated with last recorded addresses (LRAs) indicated in the readable TDMS, and recording management information of the readable TDMS is sequential recording range information (SRRI).

10. The method according to claim 9, wherein step (c) comprises:
    finding reference SRRI which is readable and the SRRI of the readable TDMS from the in-use TDMA; and
    determining start addresses of sequential recording ranges (SRRs) and corresponding last recorded addresses of the sequential recording ranges included in the reference SRRI as a detection condition.

11. The method according to claim 10, wherein in step (d), the detection procedure is performed on the recording medium for determining an update on the LRAs, and the detection procedure searches the SRRs indicated in the reference SRRI in step (c).

12. The method according to claim 11, wherein the detection procedure in step (d) comprises:
   (d1) for each SRR indicated in the reference SRRI, determining whether the SRR indicates a blank area, and if so, proceeding to step (d1) for another SRR indicated in the reference SRRI;
   (d2) if the SRR not indicating a blank area in step (d1), searching for a latest recorded address for the SRR by a search method.

13. The method according to claim 12, wherein in step (d2), the search method is a binary search.

14. The method according to claim 1, wherein the inconsistency flag of the readable TDMS is associated with defect management information of the readable TDMS, and the defect management information is a temporary defect list (TDFL).

15. The method according to claim 14, wherein the detection procedure in step (d) comprises:
   (d1) detecting a first cluster that has a corresponding first previous location address (PLA), wherein the first cluster corresponds to a first address unit number (AUN);
   (d2) seeking the recording medium at a second AUN which is after the first AUN by a first value and determining a second PLA corresponding to the second AUN;
   (d3) determining whether a difference between the second AUN and the second PLA is equal to a first difference between the first AUN and the first PLA and proceeding to step (d4) if so;
   (d4) seeking the recording medium at a next AUN and determine a next PLA corresponding to the next AUN, where the next AUN is after the first AUN by a value which is larger than the first value and is increased at every seeking;
   (d5) if it is determined that a difference between the next AUN and the next PLA is equal to the first difference, proceeding to step (d4) until the difference is different from the first difference, and proceeding to step (d6) if the difference is different from the first difference;
   (d6) determining a last PLA of a last replacement cluster with respect to the first cluster, wherein the last replacement cluster is located before the next AUN;
   wherein the update on the TDFL includes defect information based on the first cluster, the first PLA, the last replacement cluster, and the last PLA.

16. The method according to claim 15, wherein step (c) comprises:
   if the recording mode is a sequential recording mode and recording management information of the readable TDMS is sequential recording range information (SRRI), determining at least a detection condition according to information of sequential recording ranges (SRRs) included in the SRRI of the readable TDMS;
   if the recording mode is random recording mode and the recording management information of the readable TDMS is a space bit map (SBM), determining at the least a detection condition according to information of the space bit map (SBM).

17. The method according to claim 16, wherein in step (d), the detection procedure detects each open SRR indicated in the SRRI of the readable TDMS for determining an update on the TDFL.

18. The method according to claim 16, wherein in step (d), the detection procedure detects the SBM of the readable TDMS for determining an update on the TDFL.

19. The method according to claim 15, wherein step (c) comprises:
   if only the consistency flag associated with TDFL indicates unreliability, determining at least a detection condition according to information of sequential recording ranges (SRRs) and corresponding last recorded addresses (LRAs) of the SRRs included in the SRRI of the readable TDMS and latest recorded address (LRA) of the user data area indicated in the TDDS of the readable TDMS.

20. The method according to claim 19, wherein in step (d), the detection procedure searches each of the SRRs up to the corresponding LRA of the SRR determined in step (c), and up to the LRA of the user data area determined in step (c) for determining an update on the TDFL.

21. The method according to claim 15, wherein during the detection protection in step (d), address unit information is being read from the recording medium during track-following of a pickup head unit of a recording medium drive and is buffered in a memory of the recording medium drive so as to generate an update on the TDFL so as to avoid seeking each cluster of the recording medium.

22. The method according to claim 21, wherein during the detection procedure in step (d), decoding AF flag bits in the address unit information for determining a previous location address (PLA) corresponding to a cluster.

23. An apparatus for recovering disc management information of a recording medium, the recording medium including a user data area and a plurality of temporary disc management areas (TDMAs) on at least one recording layer, wherein each TDMA is for storing disc management information including a plurality of temporary disc management structures (TDMSs), each TDMS includes a temporary disc definition structure (TDDS), defect management information, and recording management information for enabling and controlling a recording mode on the recording medium, the apparatus comprising:
   a pickup head unit;
   a controller for controlling the pickup head unit to detect whether to recover disc management information if the recording medium is not closed;
   wherein the controller controls the pickup head unit to search the TDMAs for a readable TDMS which is a TDMS included in an in-use TDMA of the TDMAs and is readable, and determine whether a piece of information associated with an inconsistency flag of the readable TDMS is reliable or not;
   wherein when the controller detects that the piece of information associated with the inconsistency flag is unreliable, the controller determines at least a detection condition according to the information which is included in the readable TDMS and the in-use TDMA, and controls the pickup head unit to detect the recording medium to determine an update on the piece of information associated with the inconsistency flag, under at least a detection condition;
   wherein the controller generates an update TDMS according to the readable TDMS and the update on the piece of information associated with the inconsistency flag.

24. The apparatus according to claim 23, wherein the controller further writes the update TDMS on the recording medium, wherein the inconsistency flag in the update TDMS is set to indicate that the update on the piece of information associated with the inconsistency flag is reliable.

25. The apparatus according to claim 23, wherein when the apparatus is in an idle mode, the controller recovers the disc management information.

26. The apparatus according to claim 23, wherein in response to a write command from a host, the controller further checks whether an update on information included in the disc management information exists, and if so, the controller records the update on the recording medium.

27. The apparatus according to claim 23, wherein the controller further determines whether information included in the disc management information needed to be updated, and if so, the controller further recovers the information.

28. The apparatus according to claim 23, wherein the recording medium is a recordable blu-ray disc.

* * * * *